(12) United States Patent
Moon

(10) Patent No.: US 10,501,044 B2
(45) Date of Patent: Dec. 10, 2019

(54) CURTAIN AIRBAG APPARATUS

(71) Applicant: Hyundai Mobis Co., Ltd., Seoul (KR)

(72) Inventor: Geon Woong Moon, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 80 days.

(21) Appl. No.: 15/838,174

(22) Filed: Dec. 11, 2017

(65) Prior Publication Data

US 2018/0162311 A1 Jun. 14, 2018

(30) Foreign Application Priority Data

Dec. 12, 2016 (KR) .................. 10-2016-0168987

(51) Int. Cl.
| | |
|---|---|
| *B60R 21/232* | (2011.01) |
| *B60R 21/231* | (2011.01) |
| *B60R 21/2338* | (2011.01) |
| *B60R 21/214* | (2011.01) |
| *B60R 21/233* | (2006.01) |
| *B60R 21/00* | (2006.01) |

(52) U.S. Cl.
CPC .......... *B60R 21/232* (2013.01); *B60R 21/214* (2013.01); *B60R 21/233* (2013.01); *B60R 21/2338* (2013.01); *B60R 21/23138* (2013.01); *B60R 2021/0048* (2013.01); *B60R 2021/23316* (2013.01)

(58) Field of Classification Search
CPC ... B60R 21/232; B60R 21/231; B60R 21/233; B60R 21/214; B60R 21/2338; B60R 21/23138; B60R 2021/23107; B60R 2021/0009; B60R 2021/0048; B60R 2021/23316
See application file for complete search history.

(56) References Cited

U.S. PATENT DOCUMENTS

| | | |
|---|---|---|
| 6,070,902 A | 6/2000 | Kowalski et al. |
| 6,189,960 B1 | 2/2001 | Mumura et al. |
| 6,749,216 B2 | 6/2004 | Tanase et al. |

(Continued)

FOREIGN PATENT DOCUMENTS

| | | |
|---|---|---|
| DE | 100 39 803 | 2/2002 |
| KR | 10-2003-0063738 | 7/2003 |
| KR | 10-1509771 | 4/2015 |

OTHER PUBLICATIONS

Non-Final Office Action dated Jul. 11, 2019, issued in U.S. Appl. No. 15/838,260.

(Continued)

*Primary Examiner* — Drew J Brown
(74) *Attorney, Agent, or Firm* — H.C. Park & Associates, PLC

(57) ABSTRACT

A curtain airbag apparatus may include: a curtain airbag cushion installed on an inner side surface of a vehicle including a first chamber configured to be inflated and deployed from a collapsed position as gas is injected therein from an inflator into an expanded position covering the inner side surface of the vehicle; and a first restraint part disposed toward a side of a driver airbag cushion to limit expansion of the curtain airbag cushion and form a restraint recess in the curtain airbag cushion to allow the driver airbag cushion to be fitted into the restraint recess such that the first chamber supports the driver airbag cushion in the expanded position.

16 Claims, 8 Drawing Sheets

(56) References Cited

U.S. PATENT DOCUMENTS

| | | | |
|---|---|---|---|
| 6,783,174 B2 | 8/2004 | Bohm et al. | |
| 6,817,626 B2 | 11/2004 | Boll et al. | |
| 7,712,773 B2 * | 5/2010 | Walston | B60R 21/08 280/730.2 |
| 8,459,696 B2 | 6/2013 | Browne et al. | |
| 9,067,562 B2 * | 6/2015 | Nakashima | B60R 21/232 |
| 9,156,427 B2 * | 10/2015 | Wang | B60R 21/232 |
| 9,771,048 B2 | 9/2017 | Min et al. | |
| 2001/0017459 A1 | 8/2001 | Fischer | |
| 2002/0074775 A1 | 6/2002 | Ryan | |
| 2002/0074778 A1 | 6/2002 | Melia | |
| 2002/0125690 A1 | 9/2002 | Boll et al. | |
| 2003/0168835 A1 | 9/2003 | Thomas et al. | |
| 2004/0066022 A1 | 4/2004 | Mori | |
| 2005/0046159 A1 | 3/2005 | Noguchi et al. | |
| 2005/0116450 A1 | 6/2005 | Noguchi | |
| 2008/0012275 A1 | 1/2008 | Pinsenschaum et al. | |
| 2008/0150263 A1 | 6/2008 | Mizuno et al. | |
| 2011/0079990 A1 | 4/2011 | Cheal et al. | |
| 2014/0203541 A1 * | 7/2014 | Wei | B60R 21/213 280/730.2 |
| 2014/0217710 A1 * | 8/2014 | Fukawatase | B60R 21/233 280/730.2 |
| 2015/0115581 A1 * | 4/2015 | Mazanek | B60R 21/232 280/730.2 |
| 2016/0023626 A1 * | 1/2016 | Hiruta | B60R 21/232 280/728.2 |
| 2016/0200281 A1 * | 7/2016 | Takeshita | B60R 21/233 280/730.2 |
| 2016/0280178 A1 * | 9/2016 | Kruse | B60R 21/232 |
| 2017/0072896 A1 * | 3/2017 | Fukawatase | B60R 21/232 |
| 2017/0088083 A1 * | 3/2017 | Hiraiwa | B60R 21/23138 |
| 2018/0162313 A1 | 6/2018 | Lee et al. | |
| 2018/0162314 A1 | 6/2018 | Lee et al. | |
| 2018/0162315 A1 | 6/2018 | Lee et al. | |
| 2018/0265029 A1 | 9/2018 | Min et al. | |
| 2018/0312130 A1 | 11/2018 | Min et al. | |
| 2018/0326939 A1 * | 11/2018 | Jung | B60R 21/013 |
| 2019/0016292 A1 | 1/2019 | Son et al. | |
| 2019/0111885 A1 | 4/2019 | Hwangbo et al. | |
| 2019/0143928 A1 | 5/2019 | Raikar et al. | |

OTHER PUBLICATIONS

Non-Final Office Action dated Aug. 16, 2019, issued in U.S. Appl. No. 15/838,330.

* cited by examiner

CURTAIN AIRBAG APPARATUS

CROSS-REFERENCE TO RELATED APPLICATION

This application claims priority from and the benefit of Korean Patent Application No. 10-2016-0168987, filed on Dec. 12, 2016, which is hereby incorporated by reference for all purposes as if set forth herein.

BACKGROUND

Field

Exemplary embodiments of the invention relate to a curtain airbag apparatus, and more particularly, to a curtain airbag apparatus capable of preventing the head of an occupant from being rotated upon a side oblique collision of a vehicle.

Discussion of the Background

In general, airbags are installed in a vehicle to protect occupants. Airbags are installed at various positions depending on a body part to be protected. A curtain airbag is installed on a side of the vehicle, and a driver airbag is installed on a steering handle.

If a side oblique collision of the vehicle occurs, gas is introduced into the curtain airbag and the driver airbag. As the curtain airbag is inflated and deployed, the curtain airbag covers the side of the vehicle, and, as the driver airbag is inflated and deployed, the driver airbag covers the front of a driver. One side of the driver airbag is brought into close contact with the curtain airbag.

However, in the conventional art, upon occurrence of the side oblique collision, the head of the driver collides between the driver airbag and the curtain airbag. In this case, as the driver airbag is moved forward by being pushed away from the curtain airbag, the head of the driver collides while being rotated. Also, upon occurrence of the side oblique collision of the vehicle, since the head of the driver is moved forward in a state being brought into contact with the curtain airbag, the head of the driver is moved while being rotated by rubbing against the curtain airbag. In the case where the head of the driver collides while being rotated, the value of brain injury may increase. Therefore, it is demanded in the art to cope with this problem.

A background art of the present disclosure is disclosed in Korean Patent No. 1509771 (published on Apr. 1, 2015 and entitled 'Headlining for vehicle').

The above information disclosed in this Background section is only for enhancement of understanding of the background of the invention and, therefore, it may contain information that does not constitute prior art.

SUMMARY

Exemplary embodiments of the invention provide a curtain airbag apparatus capable of preventing the head of an occupant from being rotated upon a side oblique collision of a vehicle.

In an embodiment, a curtain airbag apparatus may include: a curtain airbag cushion installed on an inner side surface of a vehicle including a first chamber configured to be inflated and deployed from a collapsed position as gas is injected therein from an inflator into an expanded position covering the inner side surface of the vehicle; and a first restraint part disposed toward a side of a driver airbag cushion to limit expansion of the curtain airbag cushion and form a restraint recess in the curtain airbag cushion to allow the driver airbag cushion to be fitted into the restraint recess such that the first chamber supports the driver airbag cushion in the expanded position.

The first restraint part is configured to form the restraint recess in the curtain airbag cushion by preventing inflation in a thickness direction when inflating the curtain airbag cushion into its expanded position.

The curtain airbag cushion further includes a second chamber partitioned from the first chamber part by the first restraint part and configured to be inflated and deployed when inflating the curtain airbag cushion into its expanded position.

The curtain airbag cushion further includes a second restraint part configured to limit an inflation thickness of the second chamber.

The second chamber part is configured to absorb shock of from a head of an occupant upon a side oblique collision of the vehicle.

The air bag cushion as a height H upon complete deployment to the expanded position and the shortest distance between an upper end of the first restraint part and an upper joined portion of the curtain airbag cushion is within a range of about H/4 to about H/2.

The shortest distance between a lower end of the first restraint part and a lower joined portion of the curtain airbag cushion is within a range of about H/6 to about H/5.

The driver airbag cushion has an inflation thickness V and the shortest distance between the lower end of the first restraint part and a front joined portion of the curtain airbag cushion is within a range of about V to about 1.4V.

A third restraint part is configured to limit an inflation thickness of the curtain airbag cushion is disposed below a B pillar, and the distance in a front-rear direction between the first restraint part and the third restraint part is L, the second restraint part is disposed at a position that is separated from the third restraint part by about L/4 to about L/2.

The second restraint part is disposed at a position that is separated forward by L/3 from the third seaming part.

A fourth restraint part is configured to limit an inflation thickness of the curtain airbag cushion in front of the second restraint part, and the fourth restraint part is disposed at a position that is separated from the second restraint part by about L/4 to about L/2.

The fourth restraint part is disposed at a position that is separated from the second restraint part by about L/3.

The first restraint part includes a first seaming part.

The first chamber is disposed at one side of the first restraint part and the second chamber is disposed at another side of the first restraint part.

The second restraint part includes a second seaming part.

The third restraint part includes a third seaming part.

The fourth restraint part includes a fourth seaming part.

According to the embodiments, since one side of a driver airbag cushion is supported by a first chamber part in a state being fitted into a restraint recess of a curtain airbag cushion, it is possible to prevent the driver airbag cushion from being separated from the curtain airbag cushion or from being moved forward by being pushed even when the head of an occupant collides with the driver airbag cushion upon a side oblique collision of a vehicle. Therefore, since the driver airbag cushion and the curtain airbag cushion stably hold or support the head of the occupant, it is possible to prevent the head of the occupant from colliding while being rotated.

Moreover, according to the embodiments, since a second seaming part limits the inflation thickness of a second chamber part, the inflation thickness of the second chamber part is relatively thin in the curtain airbag cushion. Therefore, since the second chamber part is hardly brought into contact with the head of the occupant while the head of the occupant is moved forward upon the side oblique collision of the vehicle, it is possible to prevent one side of the head from being rotated by rubbing against the second chamber part.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
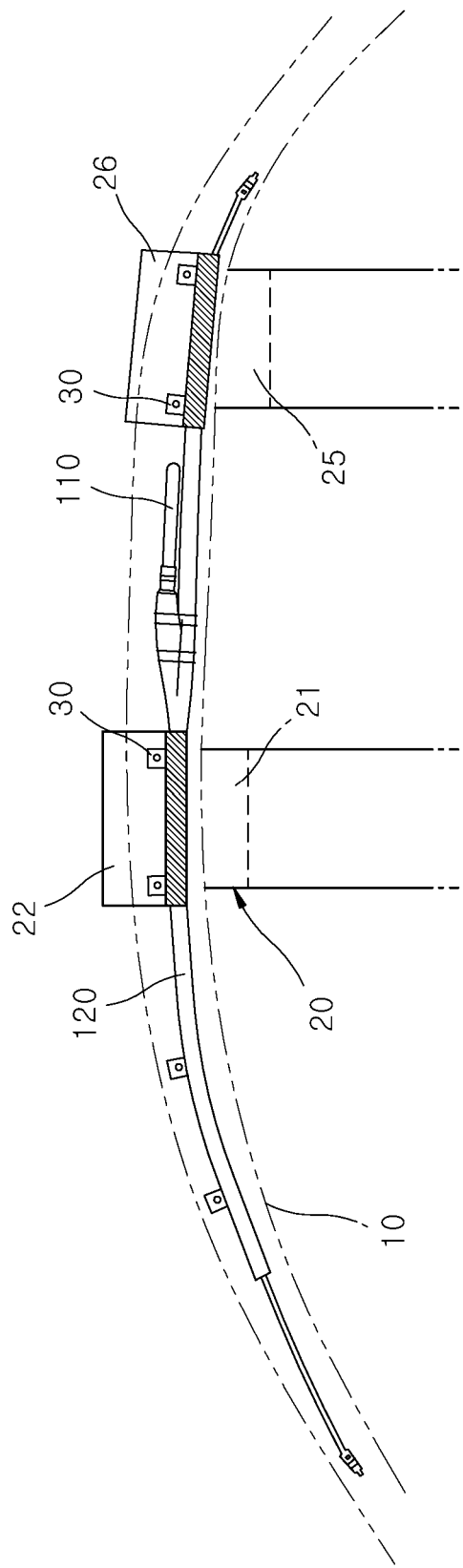
FIG. 1 is a construction view illustrating a state in which a curtain airbag apparatus in accordance with an embodiment of the invention is installed on a side of a vehicle.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Figure 2:
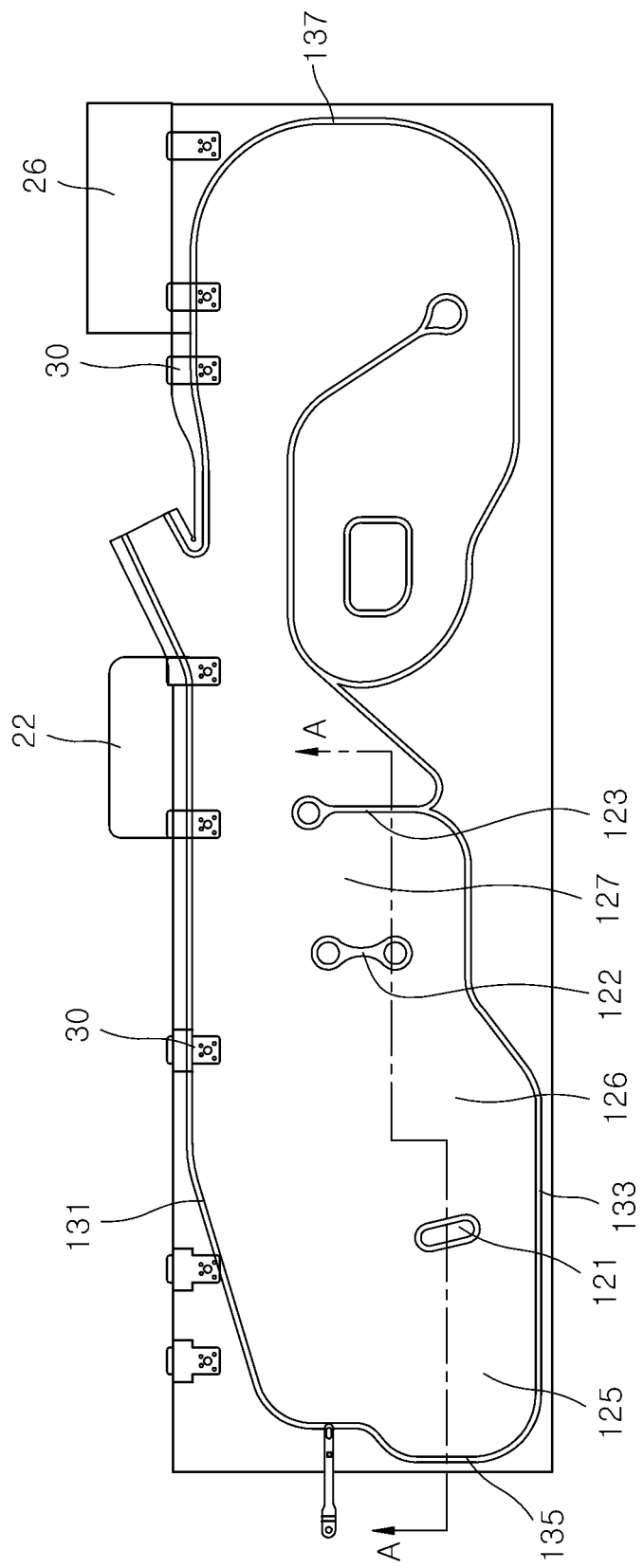
FIG. 2 is a front view illustrating a state in which the curtain airbag apparatus in accordance with the embodiment of the invention is completely deployed.
Figure 3:
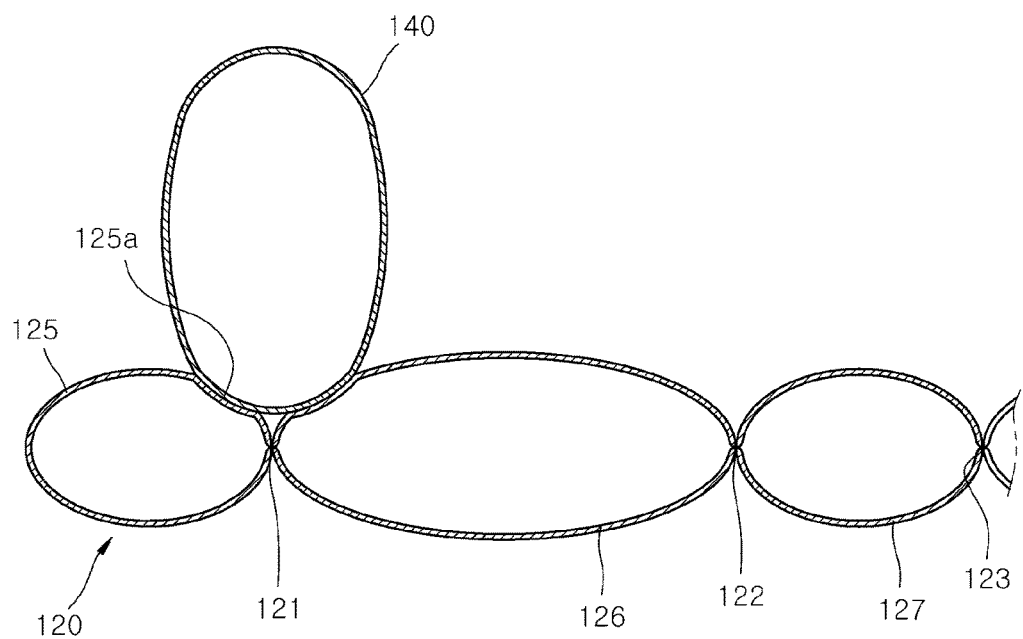
FIG. 3 is a sectional view taken along the line A-A of FIG. 2, illustrating the curtain airbag apparatus in accordance with the embodiment of the invention.
Figure 4:
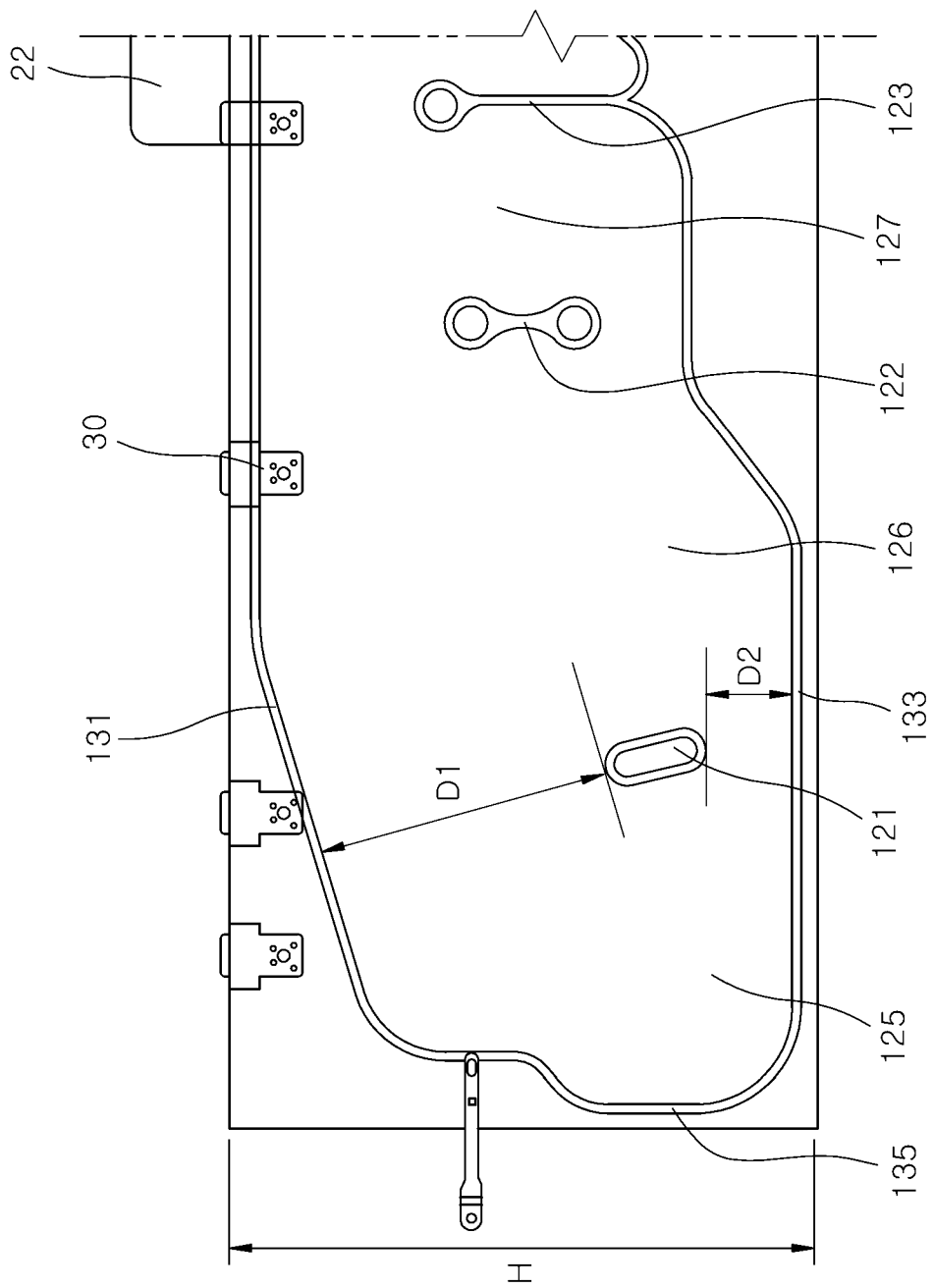
FIG. 4 is an enlarged view illustrating the position of a first seaming part in an up-down direction in the curtain airbag apparatus in accordance with the embodiment of the invention.
Figure 5:
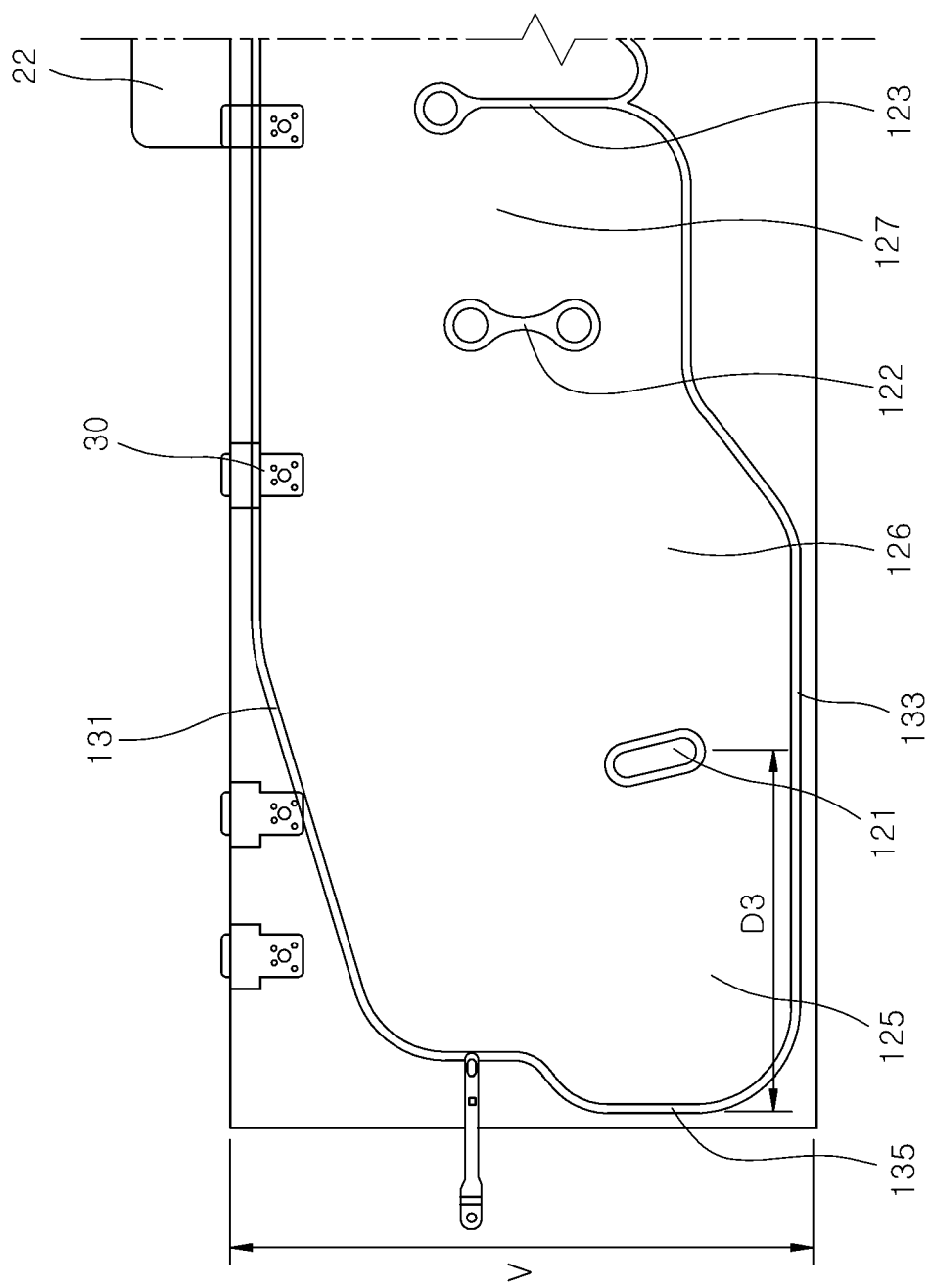
FIG. 5 is an enlarged view illustrating the position of the first seaming part in a front-rear direction in the curtain airbag apparatus in accordance with the embodiment of the invention.

FIG. 1 is a construction view illustrating a state in which a curtain airbag apparatus in accordance with an embodiment of the invention is installed on a side of a vehicle, FIG. 2 is a front view illustrating a state in which the curtain airbag apparatus in accordance with the embodiment of the invention is completely deployed, FIG. 3 is a sectional view taken along the line A-A of FIG. 2, illustrating the curtain airbag apparatus in accordance with the embodiment of the invention, FIG. 4 is an enlarged view illustrating the position of a first seaming part in an up-down direction in the curtain airbag apparatus in accordance with the embodiment of the invention, and FIG. 5 is an enlarged view illustrating the position of the first seaming part in a front-rear direction in the curtain airbag apparatus in accordance with the embodiment of the invention.

Referring to FIGS. 1 to 5, the curtain airbag apparatus in accordance with the embodiment of the invention includes a curtain airbag cushion 120 and a first seaming part 121.

The curtain airbag cushion 120 is installed on a side portion of a vehicle. The curtain airbag cushion 120 is fastened to a roof panel (not shown) by mounting tabs 30. As gas is injected from an inflator 110, the curtain airbag cushion 120 is inflated and deployed and cover an inner side surface of the vehicle. The curtain airbag cushion 120 is installed on the roof panel in a wound state, and a head liner 10 is installed on the inner side of the curtain airbag cushion 120. The wound curtain airbag cushion 120 is closed by the head liner 10 with respect to a cabin.

A pillar trim 20 is disposed underneath the head liner 10. The pillar trim 20 includes a B pillar trim 21 and a C pillar trim 25. The B pillar trim 21 is a member which is vertically disposed between a front door (not shown) and a rear door (not shown) and connects the ceiling and the floor of the vehicle. The C pillar trim 25 is a member which is vertically disposed rearward of the rear door of the vehicle. Interior parts such as a speaker are installed on the B pillar trim 21 and the C pillar trim 25. A B pillar 22 is installed inside the B pillar trim 21, and a C pillar 26 is installed inside the C pillar trim 25.

A joined part which is joined through stitching is formed around the curtain airbag cushion 120. The joined part includes an upper joined portion 131, a lower joined portion 133, a front joined portion 135 and a rear joined portion 137. Such a joined part seals the periphery of the curtain airbag cushion 120.

The first seaming part 121 is disposed laterally of a driver airbag cushion 140 in the curtain airbag cushion 120 when viewed in the front-rear direction of the vehicle. The first seaming part 121 may be formed by sewing or bonding with an adhesive the overlapping portions of a fibrous material when manufacturing the curtain airbag cushion 120.

The first seaming part 121 prevents the inflation of the curtain airbag cushion 120 in a thickness direction when the curtain airbag cushion 120 is inflated, and thereby forms a restraint recess 125a such that one side of the driver airbag cushion 140 which is inflated is fitted into the restraint recess 125a.

The curtain airbag cushion 120 includes a first chamber part 125 which supports the driver airbag cushion 140, in front of the first seaming part 121.

The driver airbag cushion 140 is installed in the steering handle (not shown) of the vehicle. The driver airbag cushion 140 is inflated and deployed toward an occupant upon a collision of the vehicle. The driver airbag cushion 140 may be deployed at the same time as the curtain airbag cushion 120 or may be deployed with a slight time difference from the curtain airbag cushion 120.

Since one side of the driver airbag cushion 140 is supported by the first chamber part 125 in a state being fitted into the restraint recess 125a, it is possible to prevent the driver airbag cushion 140 from being separated from the curtain airbag cushion 120 or being moved forward by being pushed, upon a side oblique collision of the vehicle. Therefore, since the driver airbag cushion 140 and the curtain airbag cushion 120 stably hold or support the head 1 of the occupant, it is possible to prevent the head 1 of the occupant from colliding while being rotated. The side oblique collision of the vehicle means a case in which a collision obliquely occurs from a front of the vehicle to a side of the vehicle.

The curtain airbag apparatus further includes a second seaming part 122 which is formed rearward of the restraint recess 125a, limits the inflation thickness of a second chamber part 126 positioned at the rear of the restraint recess 125a and prevents the head 1 from being rotated as the head 1 rubs against the second chamber part 126 upon the side oblique collision of the vehicle. That is to say, the second seaming part 122 is disposed rearward of the first seaming part 121. When the occupant sits on a driver seat, the head 1 of the occupant is disposed opposite the second seamed part 122.

Since the second seaming part 122 limits the inflation thickness of the second chamber part 126, the inflation thickness of the second chamber part 126 becomes relatively thin in the curtain airbag cushion 120. Therefore, since the second chamber part 126 is hardly brought into contact with the head 1 of the occupant while the head 1 of the occupant is moved forward upon the side oblique collision of the vehicle, it is possible to prevent one side of the head 1 from being rotated by rubbing against the second chamber part 126.

When the height of the curtain airbag cushion 120 when the curtain airbag cushion 120 is completely deployed is H, a shortest distance D1 between the upper end of the first seaming part 121 and the upper joined portion 131 of the curtain airbag cushion 120 is set within a range of H/4 to H/2.

The shortest distance D1 between the upper end of the first seaming part 121 and the upper joined portion 131 is designed differently depending on a vehicle. For example, in the case of a small vehicle, the shortest distance D1 between the upper end of the first seaming part 121 and the upper joined portion 131 may be designed to be close to H/2. Also, in the case of a large vehicle, the shortest distance D1 between the upper end of the first seaming part 121 and the upper joined portion 131 may be designed to be close to H/4. The reason for this will be described later in detail.

A shortest distance D2 between the lower end of the first seaming part 121 and the lower joined portion 133 of the curtain airbag cushion 120 is set within a range of H/6 to H/5. The portion between the lower end of the first seaming part 121 and the lower joined portion 133 of the curtain airbag cushion 120 supports the lower side of the driver airbag cushion 140. Further, the portion between the lower end of the first seaming part 121 and the lower joined portion 133 of the curtain airbag cushion 120 is not brought into contact with the head 1 of the occupant.

When the inflation thickness of the driver airbag cushion 140 is V, a shortest distance D3 between the lower end of the first seaming part 121 and the front joined portion 135 of the curtain airbag cushion 120 is set within a range of V to 1.4V. Therefore, the inflation thickness of the first chamber part 125 may be sufficiently secured such that one side of the driver airbag cushion 140 is able to be stably supported by the first chamber part 125.

A third seaming part 123 is formed below the B pillar trim 21 in the curtain airbag cushion 120. When the distance between the first seaming part 121 and the third seaming part 123 is L, the second seaming part 122 is formed by being separated forward by a separation distance D4 from the third seaming part 123. In the present embodiment, the separation distance D4 is L/4 to L/2 and may be L/3. A third chamber part 127 is formed between the third seaming part 123 and the second seaming part 122.

Since the second seaming part 122 is formed at a position separated forward by L/4 to L/2 from the third seaming part 123, it is possible to cause the second seaming part 122 to be positioned at a position corresponding to the head 1 of the occupant. Since the second seaming part 122 relatively reduces the inflation thickness of the second chamber part 126, when the head 1 of the occupant is moved forward upon the side oblique collision of the vehicle, it is possible to prevent the head 1 from rubbing against the second chamber part 126. Therefore, it is possible to prevent the head 1 from colliding by being rotated by the curtain airbag cushion 120 and the driver airbag cushion 140.

The vertical length of the second seaming part 122 may be appropriately selected in consideration of the kind of a vehicle, the length between the first seaming part 121 and the third seaming part 123, and so fourth.

The operation of the curtain airbag apparatus in accordance with the embodiment of the invention, constructed as mentioned above, will be described below.

Figure 6:
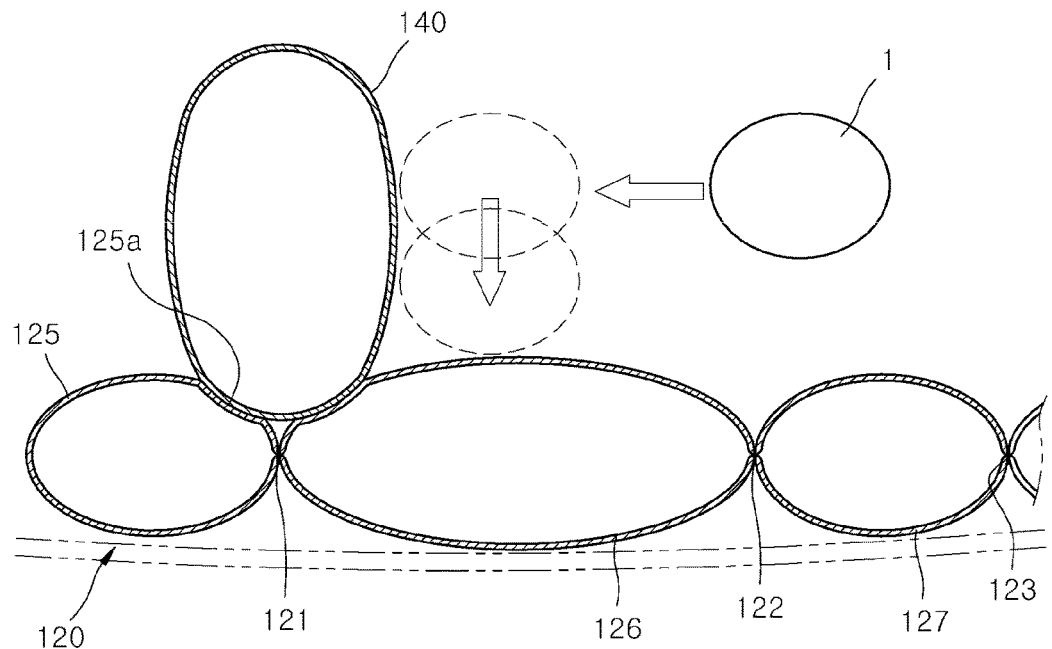
FIG. 6 is an enlarged view illustrating a behavior state of the head of an occupant upon a side oblique collision of a vehicle in the case where the curtain airbag apparatus in accordance with the embodiment of the invention is installed on a small vehicle.
Figure 7:
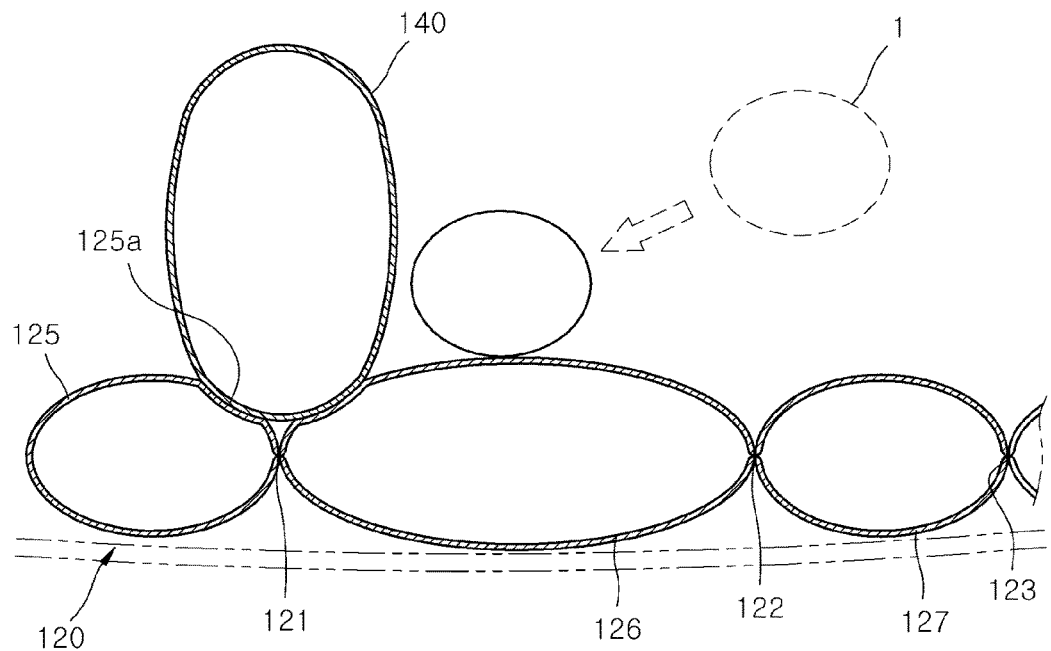
FIG. 7 is an enlarged view illustrating a behavior state of the head of an occupant upon a side oblique collision of a vehicle in the case where the curtain airbag apparatus in accordance with the embodiment of the invention is installed on a large vehicle.

FIG. 6 is an enlarged view illustrating a behavior state of the head of an occupant upon a side oblique collision of a vehicle in the case where the curtain airbag apparatus in accordance with the embodiment of the invention is installed on a small vehicle, and FIG. 7 is an enlarged view illustrating a behavior state of the head of an occupant upon a side oblique collision of a vehicle in the case where the curtain airbag apparatus in accordance with the embodiment of the invention is installed on a large vehicle.

Referring to FIGS. 6 and 7, upon the side oblique collision of the vehicle, the driver airbag cushion 140 and the curtain airbag cushion 120 are inflated and deployed at substantially the same time.

In the case where the curtain airbag cushion 120 is inflated and deployed, the first seaming part 121 limits the inflation thickness of the curtain airbag cushion 120. The restraint recess 125a is formed adjacent to the first seaming part 121, and one side of the driver airbag cushion 140 is fitted into the restraint recess 125a. Also, in front of the first seaming part 121, the first chamber part 125 is inflated convexly to support the driver airbag cushion 140 fitted into the restraint recess 125a.

Since one side of the driver airbag cushion 140 is supported by the first chamber part 125 in a state being fitted into the restraint recess 125a, even though the head 1 of the occupant collides between the driver airbag cushion 140 and the curtain airbag cushion 120 upon the side oblique collision of the vehicle, it is possible to prevent the driver airbag cushion 140 from being separated from the curtain airbag cushion 120 or being moved forward by being pushed. Therefore, since the driver airbag cushion 140 and the curtain airbag cushion 120 stably hold or support the head 1 of the occupant, it is possible to prevent the head 1 of the occupant from colliding while being rotated.

Meanwhile, the behavior of the head 1 of the occupant varies slightly depending on the kind of a vehicle. In the following, descriptions will be made separately for a small vehicle and a large vehicle.

In the case of a small vehicle, upon a side oblique collision of the vehicle, the front of the vehicle is crushed and deformed more than a large vehicle (see FIG. 6). The head 1 of the occupant is moved straight toward the driver airbag cushion 140 while the vehicle is deformed, and is moved toward the curtain airbag cushion 120 after the vehicle is deformed to a certain extent. Therefore, in the small vehicle, by setting the shortest distance between the upper end of the first seaming part 121 and the upper joined portion 131 to be close to H/2, the inflation thickness of the curtain airbag cushion 120 on the first seaming part 121 is relatively increased, whereby it is possible to protect the head 1 even though the head 1 of the occupant collides with the curtain airbag cushion 120.

Further, in the case of a large vehicle, upon a side oblique collision of the vehicle, since the front of the vehicle is slightly crushed and deformed, the head 1 of the occupant is obliquely moved toward the contact portion of the driver airbag cushion 140 and the curtain airbag cushion 120 (see FIG. 7). The driver airbag cushion 140 and the curtain airbag cushion 120 simultaneously absorb the shock of the head 1. Therefore, in the large vehicle, even when the inflation thickness of the curtain airbag cushion 120 on the first seaming part 121 is relatively decreased by setting the shortest distance between the upper end of the first seaming part 121 and the upper joined portion 131 to be close to H/4, it is possible to protect the head 1 of the occupant.

Furthermore, in the large vehicle, as the shortest distance between the upper end of the first seaming part 121 and the upper joined portion 131 is set to be close to H/4, the length of the first seaming part 121 is increased. Therefore, because one side of the driver airbag cushion 140 is fitted more deeply into the restraint recess 125a of the curtain airbag cushion 120, one side of the driver airbag cushion 140 may be more stably supported by the first chamber part 125.

Next, descriptions will be made for a curtain airbag apparatus in accordance with another embodiment of the invention. Another embodiment differs from the aforementioned embodiment in that a fourth seaming part 124 is formed between the first seaming part 121 and the third seaming part 123. Therefore, in explaining another embodiment, descriptions for components the same as those of the aforementioned embodiment will be omitted, and the same reference numerals will be used to refer to the same components.

Figure 8:
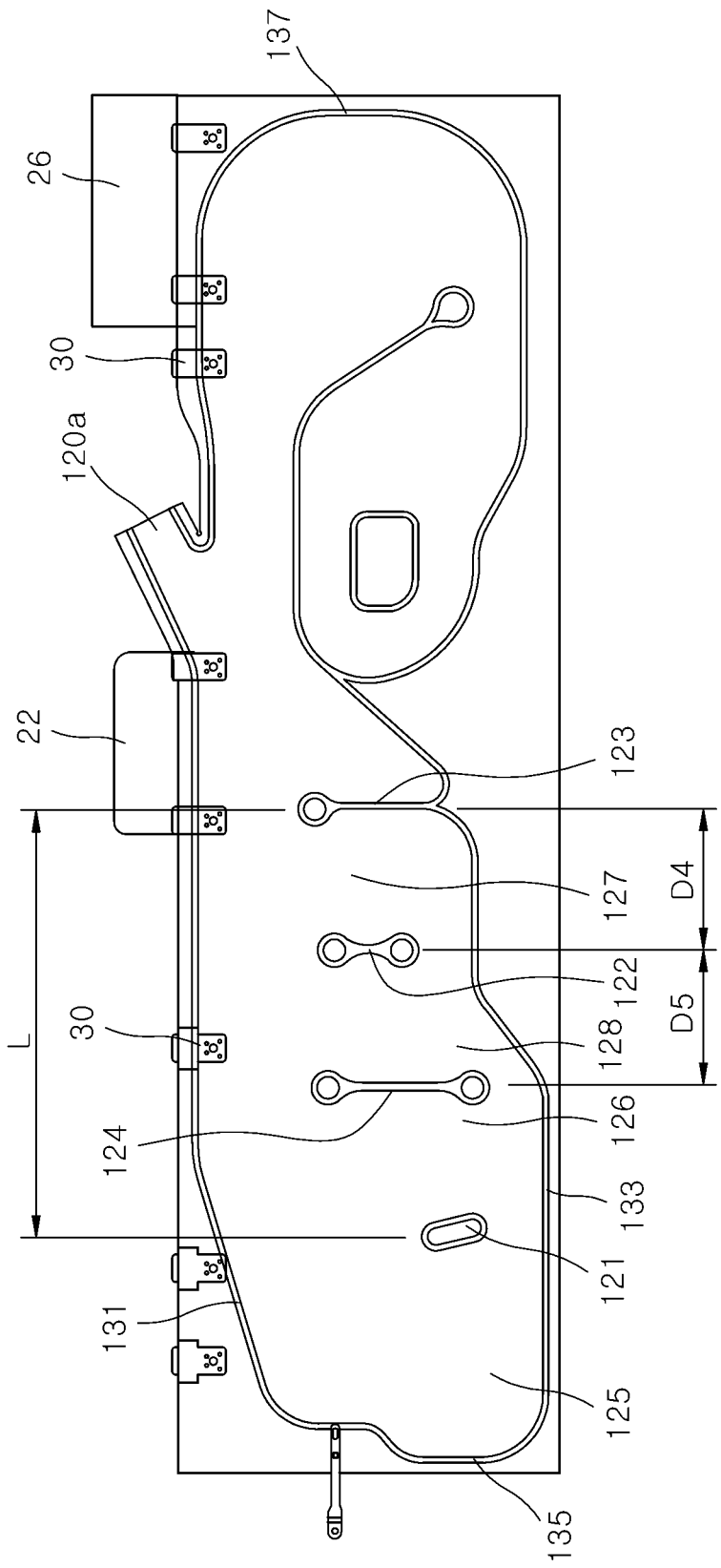
FIG. 8 is a front view illustrating a curtain airbag apparatus in accordance with another embodiment of the invention.
Figure 9:
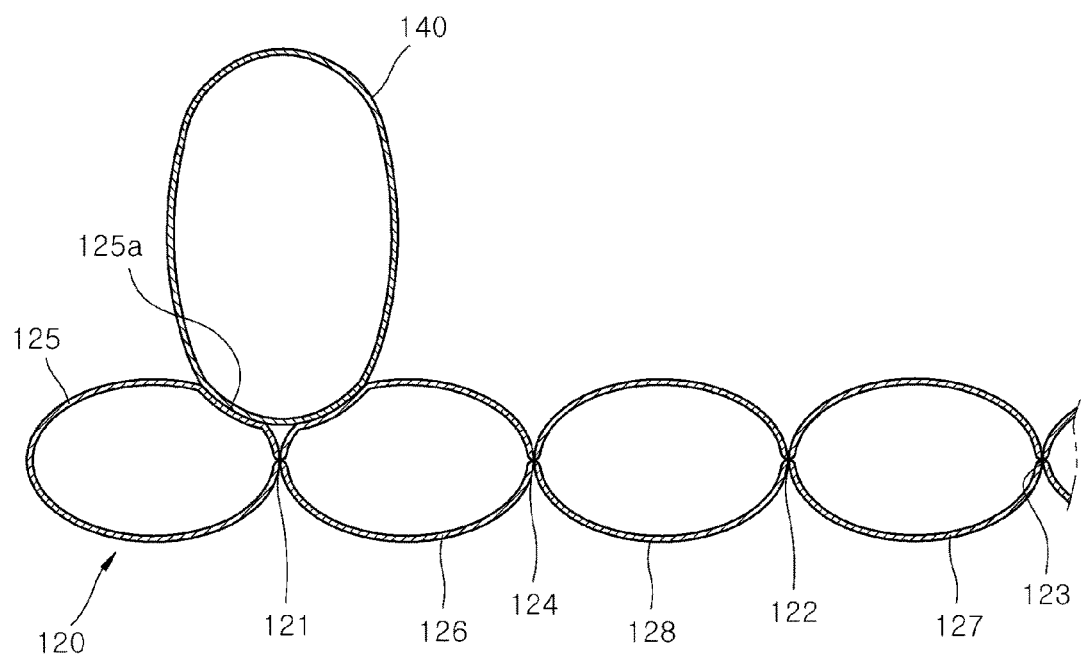
FIG. 9 is a sectional view illustrating the curtain airbag apparatus in accordance with another embodiment of the invention.

FIG. 8 is a front view illustrating a curtain airbag apparatus in accordance with another embodiment of the invention, and FIG. 9 is a sectional view illustrating the curtain airbag apparatus in accordance with another embodiment of the invention.

Referring to FIGS. 8 and 9, a third seaming part 123 is formed below a B pillar 22 in a curtain airbag cushion 120. When the distance between a first seaming part 121 and the third seaming part 123 is L, a second seaming part 122 is formed at a position that is separated forward by L/4 to L/2 from the third seaming part 123.

Moreover, in front of the second seaming part 122, a fourth seaming part 124 is formed at a position that is separated forward by a separation distance D5 from the second seaming part 122. In the present embodiment, the separation distance D5 is L/4 to L/2 and may be L/3. The fourth seaming part 124 divides a second chamber part 126 into two chamber parts. A chamber part between the second seaming part 122 and the fourth seaming part 124 is referred to as a fourth chamber part 128.

In the case of a large vehicle, the curtain airbag cushion 120 is formed to have a relatively long section between the first seaming part 121 and the third seaming part 123 (the B pillar 22). In the case where the section between the first seaming part 121 and a B pillar trim 21 is too long, the inflation thickness of the second chamber part 126 may become too thick even though the second seaming part 122 is formed between the first seaming part 121 and the third seaming part 123. If the inflation thickness of the second chamber part 126 becomes too thick, upon a side oblique collision of the vehicle, the head 1 of an occupant may rub against the second chamber part 126 while being moved forward.

Because the second seaming part 122 and fourth seaming part 124 are installed between the first seaming part 121 and the third seaming part 123 of the curtain airbag cushion 120, even when the section between the first seaming part 121 and the third seaming part 123 of the curtain airbag cushion 120 is relatively long, it is possible to decrease the inflation thickness of the curtain airbag cushion 120.

The vertical lengths of the second seaming part 122 and the fourth seaming part 124 may be appropriately selected in consideration of the kind of a vehicle, the length between the first seaming part 121 and the third seaming part 123, and so fourth.

Although preferred embodiments of the invention have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A curtain airbag apparatus comprising:
a curtain airbag cushion installed on an inner side surface of a vehicle including a first chamber configured to be inflated and deployed from a collapsed position as gas is injected therein from an inflator into an expanded position covering the inner side surface of the vehicle; and
a first restraint part disposed toward a side of a driver airbag cushion to limit expansion of the curtain airbag cushion and form a restraint recess in the curtain airbag cushion to allow the driver airbag cushion to be fitted into the restraint recess such that the first chamber supports the driver airbag cushion in the expanded position;
wherein the curtain air bag cushion has a height H upon complete deployment to the expanded position and the shortest distance between an upper end of the first restraint part and an upper joined portion of the curtain airbag cushion is within a range of about H/4 to about H/2.

2. The curtain airbag apparatus according to claim 1, wherein the first restraint part is configured to form the restraint recess in the curtain airbag cushion by preventing inflation in a thickness direction when inflating the curtain airbag cushion into its expanded position.

3. The curtain airbag apparatus according to claim 2, wherein the curtain airbag cushion further includes a second chamber partitioned from the first chamber part by the first restraint part and configured to be inflated and deployed when inflating the curtain airbag cushion into its expanded position.

4. The curtain airbag apparatus according to claim 3, wherein the curtain airbag cushion further includes a second restraint part configured to limit an inflation thickness of the second chamber.

5. The curtain airbag apparatus according to claim 4, wherein the second restraint part comprises a second seaming part.

6. The curtain airbag apparatus according to claim 4, wherein the second chamber part is configured to absorb shock of from a head of an occupant upon a side oblique collision of the vehicle.

7. The curtain airbag apparatus according to claim 3, wherein the first chamber is disposed at one side of the first restraint part and the second chamber is disposed at another side of the first restraint part.

8. The curtain airbag apparatus according to claim 2, wherein the shortest distance between a lower end of the first restraint part and a lower joined portion of the curtain airbag cushion is within a range of about H/6 to about H/5.

9. The curtain airbag apparatus according to claim 8, wherein the driver airbag cushion has an inflation thickness V and the shortest distance between the lower end of the first restraint part and a front joined portion of the curtain airbag cushion is within a range of about V to about 1.4V.

10. The curtain airbag apparatus according to claim 8, wherein a third restraint part is configured to limit an inflation thickness of the curtain airbag cushion is disposed below a B pillar, and
wherein the distance in a front-rear direction between the first restraint part and the third restraint part is L, the curtain airbag cushion further includes a second restraint part configured to limit an inflation thickness of the second chamber, the second restraint part is disposed at a position that is separated from the third restraint part by about L/4 to about L/2.

11. The curtain airbag apparatus according to claim 10, wherein the second restraint part is disposed at a position that is separated forward by L/3 from the third seaming part.

12. The curtain airbag apparatus according to claim 10, wherein a fourth restraint part is configured to limit an inflation thickness of the curtain airbag cushion in front of the second restraint part, and
wherein the fourth restraint part is disposed at a position that is separated from the second restraint part by about L/4 to about L/2.

13. The curtain airbag apparatus according to claim 10, wherein the third restraint part comprises a third seaming part.

14. The curtain airbag apparatus according to claim 12, wherein the fourth restraint part is disposed at a position that is separated from the second restraint part by about L/3.

15. The curtain airbag apparatus according to claim 12, wherein the fourth restraint part comprises a fourth seaming part.

16. The curtain airbag apparatus according to claim 1, wherein the first restraint part comprises a first seaming part.

* * * * *